United States Patent
Kekki

(10) Patent No.: US 10,693,673 B2
(45) Date of Patent: Jun. 23, 2020

(54) METHOD AND APPARATUS FOR ROUTING DATA TO CELLULAR NETWORK

(71) Applicant: Nokia Technologies Oy, Espoo (FI)

(72) Inventor: Sami Johannes Kekki, Helsinki (FI)

(73) Assignee: Nokia Technologies Oy, Espoo (FI)

(*) Notice: Subject to any disclaimer, the term of this patent is extended or adjusted under 35 U.S.C. 154(b) by 96 days.

(21) Appl. No.: 15/531,867

(22) PCT Filed: Dec. 3, 2014

(86) PCT No.: PCT/FI2014/050949
§ 371 (c)(1),
(2) Date: May 31, 2017

(87) PCT Pub. No.: WO2016/087703
PCT Pub. Date: Jun. 9, 2016

(65) Prior Publication Data
US 2017/0264454 A1  Sep. 14, 2017

(51) Int. Cl.
*H04L 12/28* (2006.01)
*H04W 40/02* (2009.01)
(Continued)

(52) U.S. Cl.
CPC ...... *H04L 12/2867* (2013.01); *H04L 12/2898* (2013.01); *H04L 69/22* (2013.01);
(Continued)

(58) Field of Classification Search
CPC .................................................. H04L 12/2867
(Continued)

(56) References Cited

U.S. PATENT DOCUMENTS 7,522,549 B2     4/2009  Karaoguz et al.
8,516,312 B2 *   8/2013  Beasley ............... G06F 11/008
                                              714/47.1
(Continued)

FOREIGN PATENT DOCUMENTS

WO    2009/047334 A2    4/2009
WO    2011149532        12/2011
WO    2014051630         4/2014

OTHER PUBLICATIONS

Extended European Search Report received for corresponding European Patent Application No. 14907545.9, dated May 4, 2018, 10 pages.
(Continued)

*Primary Examiner* — Peter G Solinsky
(74) *Attorney, Agent, or Firm* — Harrington & Smith

(57) ABSTRACT

A method, apparatus and computer program, in which: traffic is routed between a wide area network connection and a plurality of local network devices; the wide area network connection is formed in any of a plurality of connection types; each local network device of the plurality of the local network devices is identified; for each of the identified local network devices a suitable connection type is determined out of the plurality of connection types; and for each of the identified network devices the suitable connection type is arranged so that different ones of the identified network devices are able to communicate over the wide area network connection with different connection types.

14 Claims, 4 Drawing Sheets

(51) Int. Cl.
  *H04W 76/15*   (2018.01)
  *H04L 29/06*   (2006.01)
  *H04W 8/00*    (2009.01)
  *H04L 12/58*   (2006.01)
  *H04W 84/04*   (2009.01)

(52) U.S. Cl.
  CPC .......... *H04W 8/005* (2013.01); *H04W 40/02* (2013.01); *H04W 76/15* (2018.02); *H04L 51/38* (2013.01); *H04W 84/042* (2013.01)

(58) Field of Classification Search
  USPC .......................................................... 370/254
  See application file for complete search history.

(56) References Cited

U.S. PATENT DOCUMENTS

| | | | |
|---|---|---|---|
| 9,439,118 B2* | 9/2016 | Zhao | H04W 36/14 |
| 2004/0032876 A1 | 2/2004 | Garg et al. | |
| 2004/0109414 A1 | 6/2004 | Choi et al. | |
| 2006/0198356 A1 | 9/2006 | Mayernick | |
| 2008/0244095 A1* | 10/2008 | Vos | H04L 12/5692 |
| | | | 709/250 |
| 2009/0168789 A1* | 7/2009 | Wood | H04L 45/12 |
| | | | 370/402 |
| 2010/0290390 A1 | 11/2010 | Souissi et al. | |
| 2011/0170517 A1 | 7/2011 | Bakker et al. | |
| 2011/0310799 A1 | 12/2011 | Horn et al. | |
| 2012/0287817 A1* | 11/2012 | Yamaguchi | H04L 41/0846 |
| | | | 370/254 |
| 2012/0290694 A9 | 11/2012 | Marl et al. | |
| 2013/0003530 A1* | 1/2013 | Davari | H04L 12/437 |
| | | | 370/225 |
| 2013/0031271 A1 | 1/2013 | Bosch et al. | |
| 2014/0126360 A1* | 5/2014 | Rong | H04W 28/0289 |
| | | | 370/230 |
| 2014/0160983 A1* | 6/2014 | Dominguez Romero | H04W 28/22 |
| | | | 370/254 |
| 2014/0351446 A1 | 11/2014 | Cho et al. | |

OTHER PUBLICATIONS

International Search Report and Written Opinion received for corresponding Patent Cooperation Treaty Application No. PCT/FI2014/050949, dated May 12, 2015, 30 pages.

Kumar G et al., "Implementation of Software for VPLS Service Reconfiguration", International Journal of Engineering and Advanced Technology (IJEAT), vol. 2, No. 5, Jun. 2013, pp. 495-499.

* cited by examiner

| | |
|---|---|
| controlling the connections of the connected devices 110 according to the management objects | 21 |
| determining a default connection type as the suitable connection type for a connected device if no information is available to the at least one processor about properties of the connected device in question or of communications needed by the connected device | 22 |
| determining inactivity of connected devices on physical links that provide the wide area network connection to releasing the physical links that have become unnecessary | 23 |
| transferring data flows of released physical links to one or more other physical links | 24 |
| receiving configuration information from a user, the configuration information identifying a connected device and a desired suitable connection type for the identified connected device, and determining as the suitable connection type for the identified device the desired suitable connection type | 25 |
| comprising in the configuration information any one or more of the following: the connection type with all available bearer level parameters allowed by the technology that is being used by the modem on the wide area network interface; bearer level parameters like; quality of service class identification; maximum bit rate; maximum guaranteed bit rate; minimum bit rate; minimum guaranteed bit rate; maximum packet transmission delay of the wide area network connection; access point name; IP version; and IP address allocation mechanism | 26 |
| indicating to the user which ones if any of physical channels providing the wide area network connection are currently in use, optionally by using SMS | 27 |

US 10,693,673 B2

METHOD AND APPARATUS FOR ROUTING DATA TO CELLULAR NETWORK

RELATED APPLICATION

This application was originally filed as PCT Application No. PCT/FI2014/050949 filed Dec. 3, 2014.

TECHNICAL FIELD

The present application generally relates to routing data to cellular network.

BACKGROUND

This section illustrates useful background information without admission of any technique described herein representative of the state of the art.

Home routers are commonly used for internet access at home and in corporations. Home routers conveniently share a single internet connection for a number of devices attached to the router so that many devices could use same internet connection concurrently. In addition the home routers often support routing between the attached devices, i.e. devices on the ingress side of the router (also called as an intranet). With a router, all attached devices share one internet address (IP address) for the Internet outside the local network that is formed by the router with the attached devices.

The universality of the Internet is reflected by home routers in particular. They can be used to share an internet connection with the attached devices quite independently of the physical implementation of the internet connection that may be a cable television, ADSL, satellite data, cellular, optical fiber, modulation on power lines, laser links, or anything at all, as long as the physical connection is capable of transferring data in a form supported by the home router. Typically, that form supported by the routers is internet protocol (IP), in which data packets are transferred typically using TCP or UDP communication protocols, for example. Thanks to the Internet standardization, physical link implementation or layer 1 of the OSI model is unimportant for the higher levels such as layer 2 on which the Internet protocol and flow control (such as the TCP and UDP) operate. Applications that use Internet connectivity operate on yet higher level of the OSI model. This system greatly simplifies design and implementation of complex communications systems, as one layer can call standardized services of a lower protocol layer by use of standardized primitives or interlayer messages.

Some home routers are equipped with modem circuitry. A modem is a device that forms a physical link with an Internet service provider. In such a case, the number of separate units is reduced from two to one for connecting the attached devices to the Internet. Such integration also removes the need for suitable sockets and interconnecting cable, such as a LAN cord with two male RJ-45 ends as well, and requires only one mains socket instead of two. Moreover, the settings of both units can be controlled through one built-in web server with which a user can set up both modem and router settings and thus one password suffices for administration. Beside these integration aspects, both the modem side and the router side operate exactly as if they were provided by separate boxes.

Often, home routers are also configured to operate as firewalls. A firewall typically keeps track of packets sent from the ingress side to the egress or wide area network side and only accepts reply packets that not only are addressed to the Internet address (egress address) with which the home router appears on the egress side, but that also identifies themselves as such reply packets. This is also referred to as stateful packet inspection (SPI) wherein the firewall that keeps track of the state of network connections and allows only such incoming packets that match a known active connection while simply deleting others without any acknowledgement to their sender. That way malicious attackers cannot find open ports the firewall prevents response to so-called ping packets on all ports because these packets originate from the egress side without any connection to which they would relate to. By combining all of a firewall, modem and router it is possible to control all three different functionalities with a single administrator password using a browser in a local device, for example. Moreover, a relatively safe network can be simply set up by plugging in and powering one small box between the Internet service provider and the connected devices.

It is now desired to enhance capabilities of modem enabled routers or to at least provide a new technical alternative for existing modem enabled routers.

SUMMARY

Various aspects of examples of the invention are set out in the claims.

According to a first example aspect of the present invention, there is provided an apparatus comprising:
a router configured to route traffic between a wide area network connection and a plurality of local network devices;
a modem configured to form the wide area network connection in any of a plurality of connection types;
at least one processor configured to:
control the router to identify each local network device of the plurality of the local network devices;
determine for each of the identified local network devices a suitable connection type out of the plurality of connection types; and
control the modem to arrange for each of the identified network devices the suitable connection type so that different ones of the identified network devices are able to communicate over the wide area network connection with different connection types.

The connection type may specify a requirement for quality of service.

The connection type may specify a particular flow control mechanism.

The modem may be configured to concurrently form a plurality of different physical links for use by different connection types. The modem may be configured to establish and tear down different physical links on demand independently of other concurrently existing physical links.

The modem may be a cellular radio modem configured to form connections with a cellular radio network. The modem may be configured to support any existing 3G; 3.5G or 4G cellular networks such as the European wideband code-division multiple access (W-CDMA), the long-term evolution; Mobile WiMAX; time-division long-term evolution; long-term evolution advanced; international mobile telecommunications advanced The connection type may specify a physical property of the wide area network connection.

The at least one processor may be configured to perform the determining of the suitable connection types using packet inspection of a data packet. The packet inspection may comprise determining a communication protocol based on a port defined by the data packet. The data packet may be received from a local network device or the data packet may be arriving from the wide area network to the local network device. The port may be a source port. The port may be a destination port. The packet inspection may comprise determining a communication protocol of the packet. The communication protocol of the packet may be a real time communication protocol. The communication protocol of the packet may be a real time communication control protocol. The communication protocol of the packet may be a hypertext transfer protocol. The communication protocol of the packet may be a hypertext transfer protocol secure.

The at least one processor may be configured to perform the determining of the suitable connection types using a device discovery process. The device discovery process may comply with universal plug and play.

The identifying of each local network device may be performed based on layer 2 addresses. The layer 2 addresses may be Media Access Control (MAC) addresses.

The apparatus may comprise a local area network switch to enable wired connecting of the local network devices to the router. The local area network switch may comprise a plurality of local area network connector sockets.

The apparatus may comprise a wireless local area network access point to enable wireless connecting of the local network devices to the router.

The at least one processor may be further configured to detect a physical property that is characteristic to the connection of a connected device and to use the characteristic in the determining of the suitable connection type for the connected device.

The apparatus may comprise a firewall configured to inhibit entry of malicious data packets to the connected devices. The at least one processor may be configured to implement the firewall. The at least one processor may be configured to detect when a connected device is forming a new active connection to a remote location. The remote location may refer to an address accessible over the wide area network. An active connection may refer to a logical connection in which one or more data packets may be sent to and received from the remote location over the wide area network connection.

The at least one processor may be configured to maintain a table of active connections. The at least one processor may be configured to maintain a mapping between each active connection and the connected device to which the active connection relates. The at least one processor may be further configured to map for each active connection the determined suitable connection type.

The at least one processor may be further configured to control the router to direct communications of each different connection type over respective physical link. The at least one processor may be further configured to establish and tear down physical links when a need for physical links occurs or ends, respectively.

The at least one processor may be further configured to determine if communications of active connection indicate a change of a suitable connection type and to accordingly change the determined suitable connection type for that active connection.

The apparatus may be configured to enable one connected device to have a plurality of concurrent different active connections of different connection types. The mapping between the suitable connection type and the device may also comprise mapping an identification of an application running on the connected device or service data flow. The identity of the connected device and an application or service data flow may define a connection type. The at least one processor may be configured to route traffic of more than one connected device over a common one of the physical link. The apparatus may be configured to assign a different packet data network or a different access point name for different active connections. The apparatus may be configured to assign a different packet data network or a different access point name for different physical links.

The at least one processor may be configured to store connection data or connection configuration of each connected device as connected device specific management objects or as equivalent data structures in the apparatus. The at least one processor may be configured to store the management objects in or accessible to the router. The router may be configured to control the connections of the connected devices according to the management objects.

The at least one processor may be configured to determine a default connection type as the suitable connection type for a connected device if no information is available to the at least one processor about properties of the connected device in question or of communications needed by the connected device. The at least one processor may be configured to determine inactivity of connected devices on the physical links and to release physical links that have become unnecessary. The at least one processor may be configured to transfer data flows of released physical links to one or more other physical links.

The at least one processor may be configured to receive configuration information from a user, the configuration information identifying a connected device and a desired suitable connection type for the identified connected device, and to determine as the suitable connection type for the identified device the desired suitable connection type. The at least one processor may be configured to receive the configuration information from a browser running on any connected device. The at least one processor may be configured to receive the configuration information from a browser running on any connected device. The at least one processor may be configured to apply a captive portal technique to receive the configuration information. The apparatus may comprise a user input configured to enable the user to select the desired connection type among the available connection types within a predetermined period after connecting a device to the apparatus. The at least one processor may be configured to enable the user to configure the connection type with all available bearer level parameters allowed by the technology that is being used by the modem on the wide area network interface. The configuration information may comprise any one or more of the following: the connection type with all available bearer level parameters allowed by the technology that is being used by the modem on the wide area network interface.

The apparatus may comprise a user output device configured to indicate to the user which ones if any of the physical channels are currently in use. The output device may comprise a short message transmitter configure to perform the indicating using short message service. The transmitter may be formed by the modem. The short message transmitter may be a function provided by the at least one processor and configured to use the modem to transmit short messages. The short message transmitter may be configured to send short messages to an address received from the user. The address may comprise any one or more items of any of: a telephone number; an instant messaging address; and an email address. The apparatus may comprise a near field communications unit configured to receive the address from the user when the user places a near field communication enabled address source to the proximity of the near field communications unit. Alternatively or additionally, the apparatus may comprise a Bluetooth unit or a universal serial bus unit configured to receive the address from the user over a Bluetooth connection or universal serial bus connection, respectively. The at least one processor may be configured to log in an event log for how connected devices have been mapped to different connection types. The output device may be configured to notify the user of lacking connection type mapping for one or more of the connected devices.

According to a second example aspect, there is provided a method, wherein the method is performed in an apparatus, the method comprising:

routing traffic between a wide area network connection and a plurality of local network devices;

forming the wide area network connection in any of a plurality of connection types;

identifying each local network device of the plurality of the local network devices;

determining for each of the identified local network devices a suitable connection type out of the plurality of connection types; and arranging for each of the identified network devices the suitable connection type so that different ones of the identified network devices are able to communicate over the wide area network connection with different connection types.

According to a third example aspect, there is provided an apparatus, comprising:

at least one processor; and at least one memory including computer program code the at least one memory and the computer program code configured to, with the at least one processor, cause the apparatus to perform at least the following:

routing traffic between a wide area network connection and a plurality of local network devices;

forming the wide area network connection in any of a plurality of connection types;

identifying each local network device of the plurality of the local network devices;

determining for each of the identified local network devices a suitable connection type out of the plurality of connection types; and arranging for each of the identified network devices the suitable connection type so that different ones of the identified network devices are able to communicate over the wide area network connection with different connection types.

According to a fourth example aspect, there is provided an computer program, comprising:

code for routing traffic between a wide area network connection and a plurality of local network devices;

code for forming the wide area network connection in any of a plurality of connection types;

code for identifying each local network device of the plurality of the local network devices;

code for determining for each of the identified local network devices a suitable connection type out of the plurality of connection types; and code for arranging for each of the identified network devices the suitable connection type so that different ones of the identified network devices are able to communicate over the wide area network connection with different connection types; when the computer program is run on a processor.

According to a fifth example aspect of the present invention, there is provided a non-transitory memory medium comprising the computer program of the fourth example aspect.

The computer program may be stored in a computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIGS. 2a, 2b and 2c show a flow chart of a method according to an example embodiment.

DETAILED DESCRIPTON OF THE DRAWINGS

Figure 1:
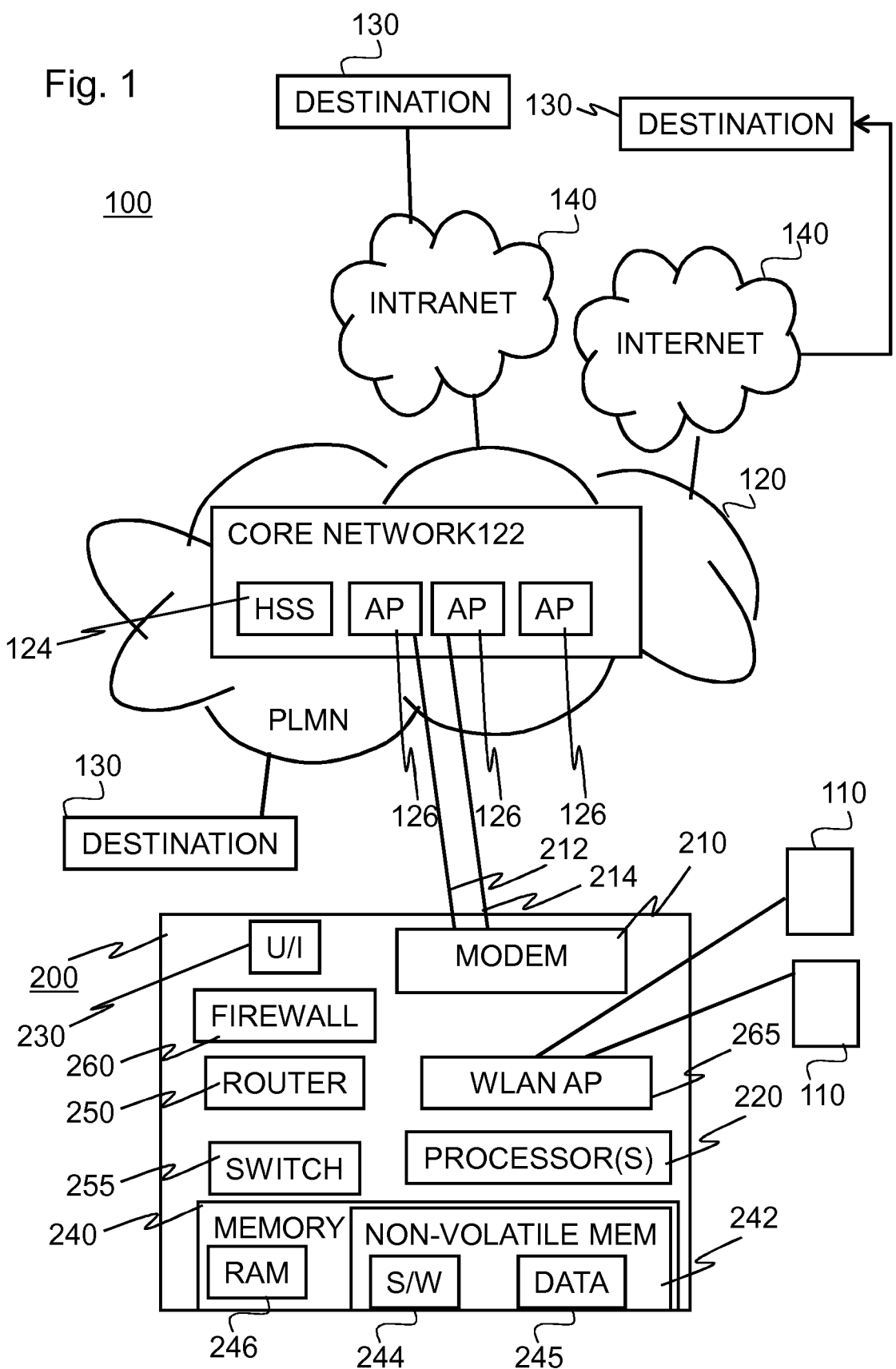
FIG. 1 shows an architectural drawing of a system of an example embodiment.

An example embodiment of the present invention and its potential advantages are understood by referring to FIGS. 1 through 2c of the drawings. In this document, like reference signs denote like parts or steps.

Present cellular home routers use the internet connectivity over the wireless backhaul simply by operating as if there were any kind of a physical connection realizing a Wide Area Network (WAN) connection. Such routers do not take advantage of the sophisticated features of the cellular access. In operation, such a router acquires an Internet Protocol (IP) address from the mobile operator's packet gateway by using an Access Point Name (APN) for internet connectivity. This IP address is then shared by the clients attached to the home router on its ingress side. In an example embodiment, the home router is configured to take advantage of the sophisticated features of the cellular system that is used as the backhaul for the internet connectivity. Such enhanced home routers with cellular backhaul could employ different types of cellular connections for different applications, services and user needs. For example, cellular networks can offer circuit switched connections with moderate data transfer rate but very small round-trip delays and small bit error rate or very high-speed data transfer in fast bursts and higher bit error rate. The former example can be well-suited for audio transfer, for example, while the latter can be useful for file transfer with error detection and retransmission mechanisms such as those commonly used by the transmission control protocol (TCP). The cellular connections can be different in that how the cellular network prioritizes them in scheduling traffic of different cellular subscribers and/or by the physical communication properties such as symbol transfer rate, number of time slots per recurring frame, channeling coding and/or transmission power.

FIG. 1 shows an architectural drawing of a system 100 of an example embodiment. The system comprises a data terminal 110 such as an Internet enabled television, laptop computer, tablet computer, game console, e-book, or any other user terminal or machine capable of communicating with other machines as part of the Internet Of Things. Depending on the intended use, the data terminals can be configured with a wide variety of different structures and functionalities. For example, user terminals 110 typically comprise a user interface with a display and some input device such as keyboard, touch screen and/or a pointer device such as a computer mouse. On the other hand, a vending machine, printer or fridge can be configured to communicate over the Internet without any user interface at all: even the printer and vending machine can be entirely controlled over the Internet, while such devices typically have a display and some keys.

The system 100 further comprises a cellular network 120 that comprises a core network 122 provided with a home subscriber server 124 and a plurality of access points 126 associated with different access point names. The system 100 further comprises a plurality of packet data network accessible destinations 130 interconnected to the core network 122 through the access points 126 and at least one packet data network 140, such as the Internet or an intranet of a corporation or other organization. Some destinations are accessible only through a particular gateway (and packet data network). In an example embodiment, the apparatus cannot directly assign the packet data network gateways for the connections but the network can only do so. The apparatus can assign a different APN for different connections and this APN then may result in assigning a different gateway by the network. In an example embodiment, the APN information is part of the connection characteristics configured for each connection.

A data connections is provided between the data terminal 110 and a particular destination 140 by the cellular network 120 using an apparatus 200 that is, for example, an enhanced home router and a modem configured to provide the data terminal 110 with a connection through a suitable access point 126.

The apparatus 200 of an example embodiment comprises a memory 240 including a persistent memory 242 that stores computer program code 244 (for example, applications and operating system) and a volatile memory or work memory. The persistent or non-volatile memory 242 is formed using, for example, one or more of: read only memory; flash-random access memory; optical memory; magnetic memory; hard disk drive; and synchronous dynamic random access memory. The work memory is formed, for example, of a random access memory; synchronous dynamic random access memory; and/or double data rate synchronous dynamic random access memory. The apparatus 200 further comprises a processor 220 for controlling the operation of the apparatus 200 by running the computer program code 242 in the work memory 246. The apparatus 200 further comprises a modem 210 for communicating with the cellular network 120. The modem 210 comprises, for example, a universal mobile telecommunications system communication unit; a long-term evolution radio unit; or satellite data communication unit. In an example embodiment, the modem 210 further comprises an asymmetric digital subscriber line modem and/or a cable modem. In some example embodiments, the modem is configured to provide in parallel both fixed network and cellular network connectivity.

The processor 220 comprises, for example, any one or more of: a master control unit; a microprocessor; a digital signal processor; an application specific integrated circuit; a field programmable gate array; and a microcontroller.

The apparatus 200 further comprises a subscriber identity module (within the modem, not shown) that is either a software entity formed by the non-volatile memory 242 and some data 245 stored in the non-volatile memory, or a hardware unit that can be plugged in or permanently mounted in the apparatus 200. For example, the subscriber identity module can be formed using a universal subscriber identity module that is stored and run by equipment of a universal integrated circuit card.

The apparatus 200 further comprises a user interface 230 that comprises a user input and/or a user output. The user input comprises, for example: a keyboard; touch screen; microphone; a speech recognition unit; and/or a pointer device such as a computer mouse. The user output comprises, for example, a display; a printer; an indicator light; a sound transducer such as a (piezoelectric) buzzer; a loudspeaker; and a speech synthesizer.

The apparatus 200 further comprises in an example embodiment any one or more of a router 250; a network switch 255 (for example, an unmanaged switch or a managed switch with 4 or 8 RJ-45 ports, for example); a firewall 260; and wireless access point 265 for wireless access using wireless local area network (WLAN), Bluetooth and/or proprietary wireless communications. FIG. 1 shows for illustrational purpose the firewall 260, router 250 and modem 210 as separate boxes as they represent different functional elements. In an example embodiment, however, the processor 220 and software 244 are configured to implement any one or more of these elements to some extent or entirely.

FIG. 1 also shows two parallel connections 212, 214 between the modem 210 and two of the access points 126 or gateways of the core network 122. Notice that the access points may have identical structure but they may still implement different physical links and therefore the reference signs in FIG. 1 are identical for the access points 126 but different for the two parallel links 212, 214. Moreover, the apparatus 200 is configured in an example embodiment to be capable of forming concurrent connections with access points of different cellular networks or with different core networks. This can be enabled, for example, by using a radio implementation that is capable of simultaneously communicating with using different recurring time slots, radio frequencies or pseudo-noise/scrambling codes (in case of code division multiple access).

Let us look closer at the apparatus 200. In an example embodiment, the apparatus 200 comprises: a router 250 configured to route traffic between a wide area network connection 212,214 and a plurality of local network devices 110;

a modem configured to form the wide area network connection in any of a plurality of connection types;

at least one processor 220 configured to:

control the router 250 to identify each local network device 110 of the plurality of the local network devices 110;

determine for each of the identified local network devices 110 a suitable connection type out of the plurality of connection types; and control the modem 210 to arrange for each of the identified network devices 110 the suitable connection type so that different ones of the identified network devices 110 are able to communicate over the wide area network connection 212, 214 with different connection types.

The connection type can specify, for example, any of a requirement for quality of service; and a particular flow control mechanism.

In an example embodiment, the modem 210 is configured to concurrently form a plurality of different physical links for use by different connection types. In an example embodiment, the modem 210 is configured to establish and tear down different physical links on demand independently of other concurrently existing physical links.

In an example embodiment, the modem 210 is a cellular radio modem configured to form connections with a cellular radio network. In an example embodiment, the modem 210 is configured to support any existing 3G; 3.5G or 4G cellular networks such as the European wideband code-division multiple access (W-CDMA), the long-term evolution; Mobile WiMAX; time-division long-term evolution; long-term evolution advanced; international mobile telecommunications advanced In an example embodiment, the connection type specifies a physical property of the wide area network connection, such as data rate, error rate, radio channel and/or radio band, round-trip delay and/or data packet size on a physical layer.

In an example embodiment, the at least one processor 220 is configured to perform the determining of the suitable connection types using packet inspection of a data packet. In an example embodiment, the packet inspection comprises determining a communication protocol based on a port defined by the data packet. In an example embodiment, the data packet is received by the at least one processor 220 from a local network device 110 or from the wide area network. In an example embodiment, the port is a source port. In an example embodiment, the port is a destination port. In an example embodiment, the packet inspection comprises determining a communication protocol of the packet, such as, for example: a real time communication protocol; a real time communication control protocol; a hypertext transfer protocol; or a hypertext transfer protocol secure. In an example embodiment, the packet inspection comprises determining source and destination IP addresses, source and destination ports and protocol information.

In an example embodiment, the at least one processor 220 is configured to perform the determining of the suitable connection types using a device discovery process, such as, for example, universal plug and play.

In an example embodiment, the identifying of each local network device 110 is performed based on layer 2 addresses, such as, for example, media access control addresses.

In an example embodiment, the apparatus 200 comprises a local area network switch to enable wired connecting of the local network devices 110 to the router.

In an example embodiment, the apparatus 200 comprises a wireless local area network access point to enable wireless connecting of the local network devices 110 to the router.

In an example embodiment, the at least one processor 220 is further configured to detect a physical property that is characteristic to the connection of a connected device 110 and to use the characteristic in the determining of the suitable connection type for the connected device 110.

In an example embodiment, the apparatus 200 comprises a firewall configured to inhibit entry of malicious data packets to the connected devices 110. In an example embodiment, the at least one processor 220 is configured to implement the firewall. In an example embodiment, the at least one processor 220 is configured to detect when a connected device 110 is forming a new active connection to a remote location. In an example embodiment, the remote location may refer to an address accessible over the wide area network. An active connection may refer to a logical connection in which one or more data packets is sent to and received from the remote location over the wide area network connection. There are various ways to form an active connection when a connected device is connected to the apparatus 200.

In an example embodiment, the apparatus 200 detects the connected device 110 and assigns an IP address to the connected device using DHCP, for example. Once the connected device 110 has been assigned an IP address, it can start sending packets. This IP address is either a network address translated (NAT) address or, the WAN address of the apparatus 200. The WAN address can be assigned to the connected device, for example, on request of the connected device 110 or based on configuration of the apparatus 200.

The forming of a Packet Data Network (PDN) connection may depend on the IP address forming mechanism, for example. In an example embodiment in which the WAN IP address is assigned to the connected device 110, the apparatus 200 creates the corresponding PDN connection as soon as the device is detected. The creation of the PDN connection may be necessary for assigning an IP address for the device 110. In an example embodiment in which the IP address is assigned to the connected device using NAT, two example embodiments are presented; in one example embodiment, the apparatus creates the corresponding wide area connection as soon as the device is detected or maps the device to an already existing one. In another example embodiment, the apparatus assigns any free Local Area Network IP address from its own address range and keeps waiting until any packet is sent by the device. In this case, according to an example embodiment, the at least one processor 220 is configured to detect when a connected device is forming a new active connection to a remote location. The at least one processor 220 may only then start creating the wide area network connection. Once the WAN connection gets created, its WAN address is then used by the NAT for any outgoing packets.

In an example embodiment, the at least one processor 220 is configured to maintain a table of active connections. In an example embodiment, the at least one processor 220 is configured to maintain a mapping between each active connection and the connected device 110 to which the active connection relates. In an example embodiment, the at least one processor 220 is further configured to map for each active connection the determined suitable connection type.

In an example embodiment, the at least one processor 220 is further configured to control the router to direct communications of each different connection type over respective physical link. In an example embodiment, the at least one processor 220 is further configured to establish and tear down physical links when a need for physical links occurs or ends, respectively.

In an example embodiment, the at least one processor 220 is further configured to determine if communications of active connection indicate a change of a suitable connection type and to accordingly change the determined suitable connection type for that active connection.

In an example embodiment, the apparatus 200 is configured to enable one connected device 110 to have a plurality of concurrent different active connections of different connection types. In an example embodiment, the mapping between the suitable connection type and the device 110 may also comprise mapping an identification of an application running on the connected device 110 or service data flow. In an example embodiment, the at least one processor 220 is configured to route traffic of more than one connected device 110 over a common one of the physical link. In an example embodiment, the apparatus 200 is configured to assign a different packet data network or a different packet data network gateway for different active connections. In an example embodiment, the apparatus 200 is configured to assign a different packet data network or a different packet data network gateway for different physical links.

In an example embodiment, the at least one processor 220 is configured to store connection data or connection configuration of each connected device 110 as connected device specific management objects or as equivalent data structures in the apparatus 200. In an example embodiment, the at least one processor 220 is configured to store the management objects in or accessible to the router. In an example embodiment, the router is configured to control the connections of the connected devices 110 according to the management objects.

In an example embodiment, the at least one processor 220 is configured to determine a default connection type as the suitable connection type for a connected device 110 if no information is available to the at least one processor 220 about properties of the connected device 110 in question or of communications needed by the connected device 110. In an example embodiment, the at least one processor 220 is configured to determine inactivity of connected devices 110 on the physical links and to release physical links that have become unnecessary. In an example embodiment, the at least one processor 220 is configured to transfer data flows of released physical links to one or more other physical links.

In an example embodiment, the at least one processor 220 is configured to receive configuration information from a user, the configuration information identifying a connected device 110 and a desired suitable connection type for the identified connected device 110, and to determine as the suitable connection type for the identified device 110 the desired suitable connection type. In an example embodiment, the at least one processor 220 is configured to receive the configuration information from a browser running on any connected device 110. In an example embodiment, the at least one processor 220 is configured to receive the configuration information from a browser running on any connected device 110. In an example embodiment, the at least one processor 220 is configured to implement a web server accessible by the browser.

In an example embodiment, the at least one processor 220 is configured to apply a captive portal technique to receive the configuration information. In an example embodiment, the apparatus 200 comprises a user input configured to enable the user to select the desired connection type among the available connection types within a predetermined period after connecting a device 110 to the apparatus 200. In an example embodiment, the at least one processor 220 is configured to enable the user to configure the connection type with all available bearer level parameters allowed by the technology that is being used by the modem on the wide area network interface. In an example embodiment, the configuration information comprises any one or more of the following: the connection type with all available bearer level parameters allowed by the technology that is being used by the modem on the wide area network interface; access point name; IP version; and IP address allocation mechanism. The address allocation mechanism is, in an example embodiment, selected from a group consisting of any one or more of: network address translation; private address or prefix use in the intranet side; assigning wide area network IP address to the connected device 110 for example by means of bridging the wide area network interface and the said intranet interface.

In an example embodiment, the apparatus 200 comprises a user output device configured to indicate to the user which ones if any of the physical channels are currently in use. The indicating can be carried out by sending one or more notifications to the user In an example embodiment, the output device comprises a short message transmitter configure to perform the indicating using short message service. In an example embodiment, the short message transmitter is a function provided by the at least one processor 220 and configured to use the modem to transmit short messages. In an example embodiment, the short message transmitter is configured to send short messages to an address received from the user. In an example embodiment, the address comprises any one or more items of any of: a telephone number; an instant messaging address; and an email address.

In an example embodiment, the notifications comprise any of: information about the physical channels currently in use information about a missing configuration for a detected device; information about any relevant event requiring user's attention. It is observed that the lack of configuration specific to the connected device 110, or the inability of the apparatus 200 to determine the specific connection characteristics need not prevent the use of the connected device 110 but the connected device 110 may yet be assigned to a default connection that may not be optimal or even appropriate for that apparatus. By notifying the user, such problems can be rectified.

In an example embodiment, the apparatus is further configured to keep a log file of any events related to the operation of the apparatus, such as any missing configuration event. The log file may be configured to allow the user to create a configuration for a new or otherwise yet unconfigured device.

In an example embodiment, the apparatus 200 comprises a near field communications unit configured to receive the address from the user when the user places a near field communication enabled address source to the proximity of the near field communications unit. Alternatively or additionally, the apparatus 200 comprises a Bluetooth unit or a universal serial bus unit configured to receive the address from the user over a Bluetooth connection or universal serial bus connection, respectively. In an example embodiment, the at least one processor 220 is configured to log in an event log for how connected devices 110 have been mapped to different connection types. In an example embodiment, the output device 110 is configured to notify the user of lacking connection type mapping for one or more of the connected devices 110.

Figure 2A:
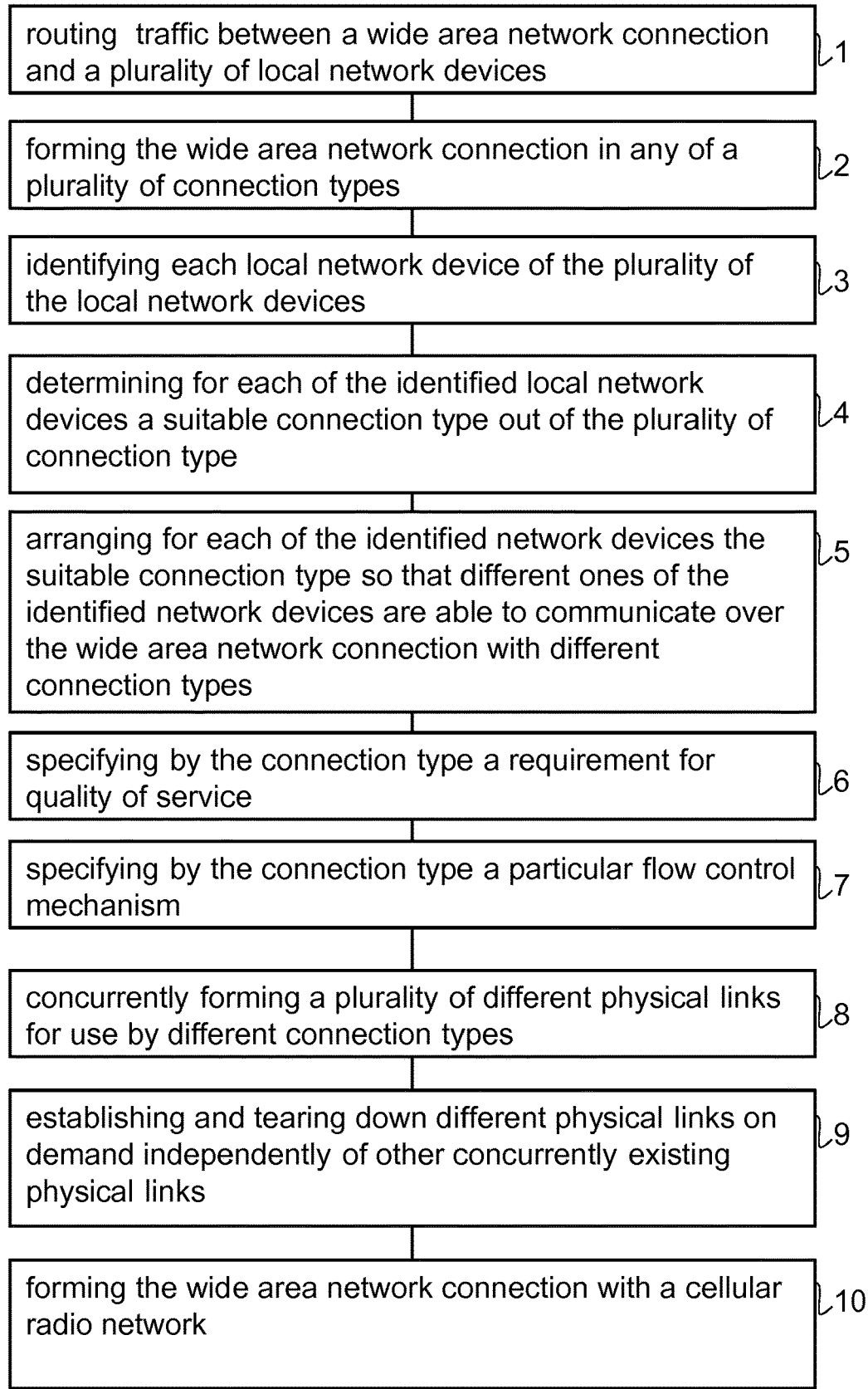
Figure 2B:
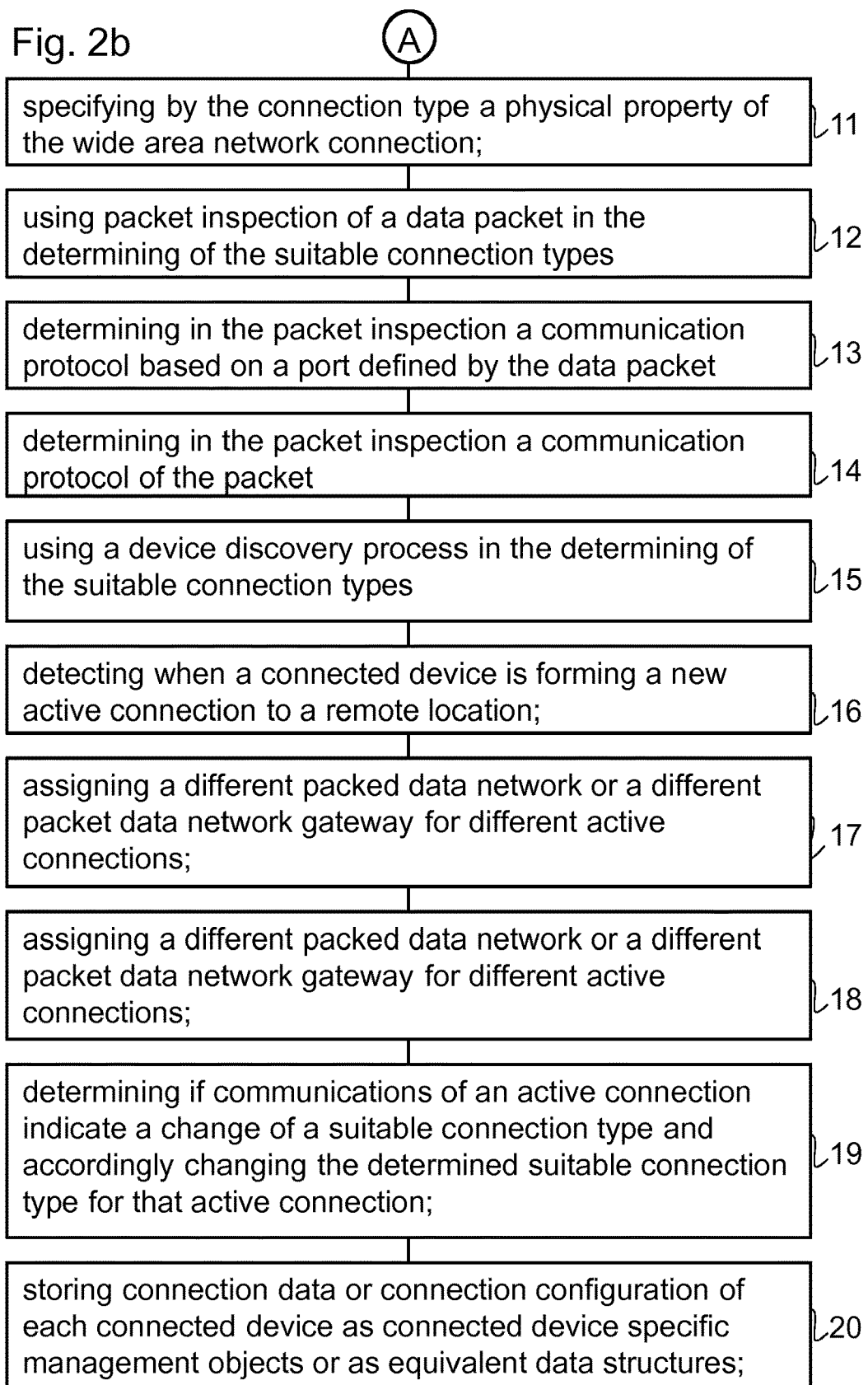

FIGS. 2a, 2b and 2c show a flow chart of a method according to an example embodiment. The method is performed in an apparatus. The method comprises one or more of:

1. routing traffic between a wide area network connection and a plurality of local network devices 110;

2. forming the wide area network connection in any of a plurality of connection types;

3. identifying each local network device of the plurality of the local network devices 110;

4. determining for each of the identified local network devices 110 a suitable connection type out of the plurality of connection types;

5. arranging for each of the identified network devices 110 the suitable connection type so that different ones of the identified network devices 110 are able to communicate over the wide area network connection with different connection types;

6. specifying by the connection type a requirement for quality of service;

7. specifying by the connection type a particular flow control mechanism;

8. concurrently forming a plurality of different physical links for use by different connection types;

9. establishing and tearing down different physical links on demand independently of other concurrently existing physical links;

10. forming the wide area network connection with a cellular radio network;

11. specifying by the connection type a physical property of the wide area network connection;

12. using packet inspection of a data packet in the determining of the suitable connection types 13. determining in the packet inspection a communication protocol based on a port defined by the data packet;

14. determining in the packet inspection a communication protocol of the packet;

15. using a device discovery process in the determining of the suitable connection types;

16. detecting when a connected device is forming a new active connection to a remote location;

17. assigning a different packet data network or a different packet data network gateway for different active connections;

18. assigning a different packet data network or a different packet data network gateway for different active connections;

19. determining if communications of an active connection indicate a change of a suitable connection type and accordingly changing the determined suitable connection type for that active connection;

20. storing connection data or connection configuration of each connected device as connected device specific management objects or as equivalent data structures;

21. controlling the connections of the connected devices 110 according to the management objects;

22. determining a default connection type as the suitable connection type for a connected device if no information is available to the at least one processor 220 about properties of the connected device in question or of communications needed by the connected device;

23. determining inactivity of connected devices 110 on physical links that provide the wide area network connection to releasing the physical links that have become unnecessary;

24. transferring data flows of released physical links to one or more other physical links;

25. receiving configuration information from a user, the configuration information identifying a connected device and a desired suitable connection type for the identified connected device, and determining as the suitable connection type for the identified device the desired suitable connection type;

26. comprising in the configuration information any one or more of the following: the connection type with all available bearer level parameters allowed by the technology that is being used by the modem on the wide area network interface; bearer level parameters; quality of service class identification; maximum bit rate; maximum guaranteed bit rate; minimum bit rate; minimum guaranteed bit rate; maximum packet transmission delay of the wide area network connection; access point name; IP version; and IP address allocation mechanism; access point name; IP version; and IP address allocation mechanism.

27. indicating to the user which ones if any of physical channels providing the wide area network connection are currently in use, optionally by using short message service.

Without in any way limiting the scope, interpretation, or application of the claims appearing below, a technical effect of one or more of the example embodiments disclosed herein is that devices of particular may be mapped to a physical interface where a connectivity service suited for such devices is available.

Another technical effect of one or more of the example embodiments disclosed herein is that by mapping suitable connectivity services to different devices and possibly also for different services or applications of one connected device, the devices, applications and services may be provided with best-suited connectivity services automatically without necessitating user action. Yet another technical effect of one or more of the example embodiments disclosed herein is that by automatically tearing down physical links that are no longer necessary, data transmission resources of the cellular network may be released for use of other subscribers and/or cost incurring may be reduced.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 1. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising:
at least one processor; and
at least one memory including computer program code,
where the at least one memory and the computer program code are configured, with the at least one processor, to cause the apparatus to at least:

route traffic between a wide area network connection and a plurality of local network devices associated with a communication network;

form the wide area network connection in any of a plurality of connection types;

control the router to identify each local network device of the plurality of the local network devices;

automatically determine based at least on a packet inspection of traffic protocols of each port defined by data of the traffic for each of the identified local network devices, a suitable connection type out of the plurality of connection types using packet inspection of a data packet of the traffic, wherein the packet inspection comprises determining a communication protocol of the data packet based on a port defined by the data packet; and based on the determining:

arrange for each of the identified network devices to use at least one of a different network and a different gateway associated with the communication network to form a plurality of physical links different than other concurrently existing physical links for use by the different connection types, assign a different physical link of the plurality of physical links to each identified network device of the identified network devices for the suitable connection type for communication by different ones of the identified network devices with different connection types of the plurality of connection types over the communication network, and tear down physical links of the other concurrently existing physical links that are no longer used for the different connection types.

2. The apparatus of claim 1, wherein the connection type specifies at least one of a requirement for quality of service or a particular flow control mechanism.

3. The apparatus of claim 1, wherein the packet inspection associated with the traffic protocols of each port defined by data of the traffic for each of the identified local network devices is determining a source Internet Protocol address, and a destination Internet Protocol address associated with each port defined by data of the traffic for each of the identified local network devices, and is determining at least one of a real time communication protocol, a real time communication control protocol, a hypertext transfer protocol, or a hypertext transfer protocol secure packet associated with each port defined by data of the traffic for each of the identified local network devices.

4. The apparatus of claim 1, wherein the at least one memory including the computer program code is configured with the at least one processor to cause the apparatus to form connections with a cellular radio network.

5. The apparatus of claim 1, wherein the connection type specifies a physical property of the wide area network connection.

6. The apparatus of claim 1, wherein the at least one memory including the computer program code is configured with the at least one processor to cause the apparatus to create, in response to the identifying, a packet data network connection for each of the identified network devices; and assign an Internet Protocol address for each of the identified network devices using the packet data network connection, wherein the assigned Internet Protocol address is used for the arranging of each of the identified network devices.

7. The apparatus of claim 1, wherein the at least one memory including the computer program code is configured with the at least one processor to cause the apparatus to perform the determining of the suitable connection types using a universal plug and play compliant device discovery process.

8. The apparatus of claim 1, wherein the identifying of each local network device is performed based on associated layer 2 addresses.

9. The apparatus of claim 1, wherein the apparatus comprises a wireless local area network access point configured to enable wireless connecting of the local network devices to the apparatus.

10. The apparatus of claim 1, wherein the at least one memory including the computer program code is configured with the at least one processor to cause the apparatus to detect a physical property that is characteristic to the connection of a connected device and to use the characteristic in the determining of the suitable connection type for the connected device.

11. A method, comprising:

routing traffic between a wide area network connection and a plurality of local network devices associated with a communication network;

forming the wide area network connection in any of a plurality of connection types; identifying each local network device of the plurality of the local network devices;

automatically determining based at least on a packet inspection of traffic protocols of each port defined by data of the traffic for each of the identified local network devices a suitable connection type out of the plurality of connection types using packet inspection of a data packet of the traffic, wherein the packet inspection comprises determining a communication protocol of the data packet based on a port defined by the data packet; and based on the determining:

arranging for each of the identified network devices to use at least one of a different network and a different gateway associated with the communication network to form a plurality of physical links different than other concurrently existing physical links for use by the different connection types, assigning a different physical link of the plurality of physical links to each identified network device of the identified network devices for the suitable connection type for communication by different ones of the identified network devices with different connection types of the plurality of connection types over the communication network, and tearing down physical links of other concurrently existing physical links that are no longer used for the different connection types.

12. The method of claim 11, wherein the connection type specifies at least one of a requirement for quality of service or a particular flow control mechanism.

13. The method of claim 11, wherein the the packet inspection associated with the traffic protocols of each port defined by data of the traffic for each of the identified local network devices is determining a source Internet Protocol address, and a destination Internet Protocol address associated with each port defined by data of the traffic for each of the identified local network devices, and is determining at least one of a real time communication protocol, a real time communication control protocol, a hypertext transfer protocol, or a hypertext transfer protocol secure packet associated with each port defined by data of the traffic for each of the identified local network devices.

14. A non-transitory memory medium comprising a computer program, the computer program executed by at least one processor to perform operations comprising:

routing traffic between a wide area network connection and a plurality of local network devices associated with a communication network;

forming the wide area network connection in any of a plurality of connection types; code for identifying each local network device of the plurality of the local network devices;

automatically determining based at least on a packet inspection of traffic protocols of each port defined by data of the traffic for each of the identified local network devices, a suitable connection type out of the plurality of connection types using packet inspection of a data packet of the traffic, wherein the packet inspection comprises determining a communication protocol of the data packet based on a port defined by the data packet; and based on the determining:

arranging for each of the identified network devices to use at least one of a different network and a different gateway associated with the communication network to form a plurality of physical links different than other concurrently existing physical links for use by the different connection types, assigning a different physical link of the plurality of physical links to each identified network device of the identified network devices for the suitable connection type for communication by different ones of the identified network devices over the communication network, and tearing down physical links of other concurrently existing physical links that are no longer used for the different connection types.

* * * * *